US00RE43270E

(19) United States
(12) Reissued Patent
Thottakkara

(10) Patent Number: US RE43,270 E
(45) **Date of Reissued Patent: *Mar. 27, 2012**

(54) OPTIMIZATIONS AND ENHANCEMENTS TO THE IEEE RSTP 802.1W IMPLEMENTATION

(75) Inventor: Benny J. Thottakkara, Cupertino, CA (US)

(73) Assignee: Foundry Networks LLC, San Jose, CA (US)

( * ) Notice: This patent is subject to a terminal disclaimer.

(21) Appl. No.: 13/019,278

(22) Filed: Feb. 1, 2011

Related U.S. Patent Documents

Reissue of:
(64) Patent No.: 7,720,011
Issued: May 18, 2010
Appl. No.: 12/082,682
Filed: Apr. 11, 2008

U.S. Applications:
(63) Continuation of application No. 10/326,494, filed on Dec. 20, 2002, now Pat. No. 7,379,429.

(51) Int. Cl.
*H04L 12/28* (2006.01)

(52) U.S. Cl. ..... 370/256; 370/401; 370/238

(58) Field of Classification Search ..... 370/254, 370/255, 401, 402, 408, 249, 216, 242, 252, 370/244, 258; 709/238, 239
See application file for complete search history.

(56) References Cited

U.S. PATENT DOCUMENTS

| | | | | |
|---|---|---|---|---|
| 6,330,229 | B1 * | 12/2001 | Jain et al. | 370/256 |
| 6,717,950 | B2 * | 4/2004 | Lui et al. | 370/408 |
| 7,027,453 | B2 * | 4/2006 | Lui et al. | 370/408 |
| 7,061,875 | B1 | 6/2006 | Portolani et al. | |
| 7,103,008 | B2 * | 9/2006 | Greenblat et al. | 370/258 |
| 7,379,429 | B1 | 5/2008 | Thottakkara | |
| 7,564,779 | B2 | 7/2009 | Rose et al. | |
| RE42,253 | E * | 3/2011 | Thottakkara | 370/256 |
| 7,944,858 | B2 * | 5/2011 | Tabery et al. | 370/256 |
| 2001/0021177 | A1 * | 9/2001 | Ishii | 370/256 |
| 2002/0101875 | A1 * | 8/2002 | Lui et al. | 370/402 |
| 2002/0181412 | A1 * | 12/2002 | Shibasaki | 370/256 |
| 2003/0193959 | A1 * | 10/2003 | Lui et al. | 370/401 |

(Continued)

OTHER PUBLICATIONS

IEEE, Standard for Local and Metropolitan Area Networks—Common Specification, Part 3: Media Access Control (MAC) Bridges (the Local Institute of Electrical and Electronics Engineers, Inc., New York, NY 1998).

(Continued)

*Primary Examiner* — Chuong T Ho
(74) *Attorney, Agent, or Firm* — Nixon Peabody LLP; John P. Schaub

(57) ABSTRACT

[In an embodiment, a] *A* method for supporting dynamic configuration changes[,includes:] *comprises* receiving a message from a current root bridge[;], comparing [the] *a* bridge media access control (MAC) address of a receiving port to [the] *a* bridge MAC address of the received message[;], if the bridge MAC addresses are [not] the same, then comparing a current priority value [to] *with* a previous priority value of the current root bridge[; if the current priority value is inferior, then], determining if the [port] receiving [the message] *port* is a qualified root port[;], and if the port is a qualified root port, then returning a superior designated message to [permit each bridge to] execute [a rapid spanning tree calculation for use in a dynamic configuration change] *an RSTP calculation*.

12 Claims, 15 Drawing Sheets

U.S. PATENT DOCUMENTS

| | | | |
|---|---|---|---|
| 2007/0008964 | A1 | 1/2007 | Rose et al. |
| 2007/0118628 | A1 | 5/2007 | Kumar et al. |
| 2008/0310421 | A1 | 12/2008 | Teisberg et al. |
| 2009/0274153 | A1 | 11/2009 | Kuo et al. |
| 2009/0323518 | A1 | 12/2009 | Rose et al. |

OTHER PUBLICATIONS

IEEE Standard for Local and Metropolitan Area Networks—Common Specification, Part 3: Media Access Control (MAC) Bridges—Amendment 2: Rapid Reconfiguration (The Institute of Electrical and Electronics Engineers, Inc., New York, NY 2001), pp. 1-108.
Office Action in U.S. Appl. No. 10/326,494, mailed Jan. 3, 2007.
Office Action in U.S. Appl. No. 10/326,494, mailed Aug. 9, 2007.
Notice of Allowance in U.S. Appl. No. 10/326,494, mailed Mar. 17, 2008.
Office Action in U.S. Appl. No. 12/082,682, mailed Oct. 13, 2009.
Notice of Allowance in U.S. Appl. No. 12/082,682, mailed Feb. 16, 2010.
Notice of Allowance in U.S. Appl. No. 12/082,682, mailed Mar. 30, 2010.
Notice of Allowance in U.S. Appl. No. 12/248,789, mailed Jan. 6, 2011.
Office Action in U.S. Appl. No. 12/760,528, mailed Aug. 4, 2011.

* cited by examiner

OPTIMIZATIONS AND ENHANCEMENTS TO THE IEEE RSTP 802.1W IMPLEMENTATION

Matter enclosed in heavy brackets [ ] appears in the original patent but forms no part of this reissue specification; matter printed in italics indicates the additions made by reissue.

CROSS-REFERENCE TO RELATED APPLICATIONS

This application is a continuation of prior U.S. patent application Ser. No. 10/326,494, entitled "Optimizations and Enhancements to the IEEE RSTP 802.1w Implementation," filed on Dec. 20, 2002, now U.S. Pat. No. 7,379,429.

TECHNICAL FIELD

Embodiments of the present invention relate generally to communication networks. More particularly, embodiments of the present invention provide optimizations and enhancements to the IEEE RSTP 802.1w implementation.

BACKGROUND

The Institute of Electrical and Electronics Engineers (IEEE) 802.1D Spanning-Tree Protocol (STP) standard provides distributed routing over multiple Local Area Networks (LANs) that are connected by bridges. The 802.1D standard is presented in detail in IEEE Standard for Local and Metropolitan Area Networks—Common Specification, Part 3: Media Access Control (MAC) Bridges (The Institute of Electrical and Electronics Engineers, Inc., New York, N.Y. 1998), which is hereby fully incorporated herein by reference. The 802.1D standard was designated at a time where recovering network connectivity within about 60 seconds after an outage was considered as adequate performance. For any network topology changes, the convergence time in the 802.1D standard is usually about 50 seconds (i.e., two times the forward delay plus a maximum age time).

The IEEE 802.1w Rapid Spanning-Tree Protocol (RSTP) standard reduces the convergence time as compared to the 802.1D standard and may be considered as an evolution of the 802.1D standard. The 802.1w standard is presented in detail in IEEE Standard for Local and Metropolitan Area Networks—Common Specification, Part 3: Media Access Control (MAC) Bridges—Amendment 2: Rapid Reconfiguration, (The Institute of Electrical and Electronics Engineers, Inc., New York, N.Y. 2001), which is hereby fully incorporated herein by reference. When a bridge failure or port failure occurs, the RSTP protocol will calculate a new proposal (a loop-free topology) within typically a response time of about 300 milliseconds by deciding which particular ports will be a forwarding port and a blocking port. A port failure can include a link failure or a creation of a new link.

However, there is a need for further enhancements and optimizations to the implementation of the IEEE 802.1w standard.

SUMMARY OF EMBODIMENTS OF THE INVENTION

In one embodiment of the *present* invention, a method for supporting dynamic configuration changes[.] includes:

receiving a message from a current root bridge;

comparing the bridge media access control (MAC) address currently held by a receiving port in a Port Priority Vector of the receiving port to the bridge MAC address of the received message;

if the bridge MAC addresses are [not] the same, then comparing a current priority value to a previous priority value of the current root bridge;

if the current priority value is inferior, then determining if the port receiving the message is a qualified root port; and if the port is a qualified root port, then returning a superior designated message to permit each bridge to execute a rapid spanning tree calculation for use in a dynamic configuration change.

In another embodiment of the invention, an apparatus with bridge functionality in a network[.] includes:

a port information state machine configured to:

receive a message from a current root bridge;

compare the bridge media access control (MAC) address of a receiving port to the bridge MAC address of the received message;

if the bridge MAC addresses are [not] the same, then compare a current priority value to a previous priority value of the current root bridge;

if the current priority value is inferior, then determine if the port receiving the message is a qualified root port; and if the port is a qualified root port, then return a superior designated message to permit each bridge to execute a rapid spanning tree calculation for use in a dynamic configuration change.

In another embodiment of the invention, a method of enhancing a Topology Change State Machine in the rapid spanning-tree protocol (RSTP), includes:

determining if an event is a valid topology change event;

stopping the tcWhile timers globally on the bridge;

propagating a new topology change event as a latest topology change event to all bridges across the network; and in response to the new topology change event, initiating a flushing cycle of learned addresses on all bridges across the network.

In another embodiment of the invention, an apparatus with bridge functionality in a network, includes:

a Topology Change State Machine configured to:

determine if an event is a valid topology change event;

stop a tcWhile timer;

propagate a new topology change event as a latest topology change event to all bridges across the network; and initiate a flushing cycle of learned addresses on all bridges across the network, in response to the new topology change event In another embodiment of the invention, a method of steady state optimization in the rapid spanning-tree protocol (RSTP), includes:

detecting for a steady state condition; and avoiding the invocation of a Port Role Transition (PRT) State Machine during the steady state condition.

In another embodiment of the invention, an apparatus for steady state optimization in the rapid spanning-tree protocol (RSTP), includes:

a bridge configured to detect for a steady state condition and avoid the invocation of a Port Role Transition (PRT) State Machine during the steady state condition.

These and other features of an embodiment of the present invention will be readily apparent to persons of ordinary skill in the art upon reading the entirety of this disclosure, which includes the accompanying drawings and claims.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF PREFERRED EMBODIMENTS

In the description herein, numerous specific details are provided, such as examples of components and/or methods, to provide a thorough understanding of embodiments of the invention. One skilled in the relevant art will recognize, however, that an embodiment of the invention can be practiced without one or more of the specific details, or with other apparatus, systems, methods, components, materials, parts, and/or the like. In other instances, well-known structures, materials, or operations are not shown or described in detail to avoid obscuring aspects of embodiments the invention.

Figure 1:
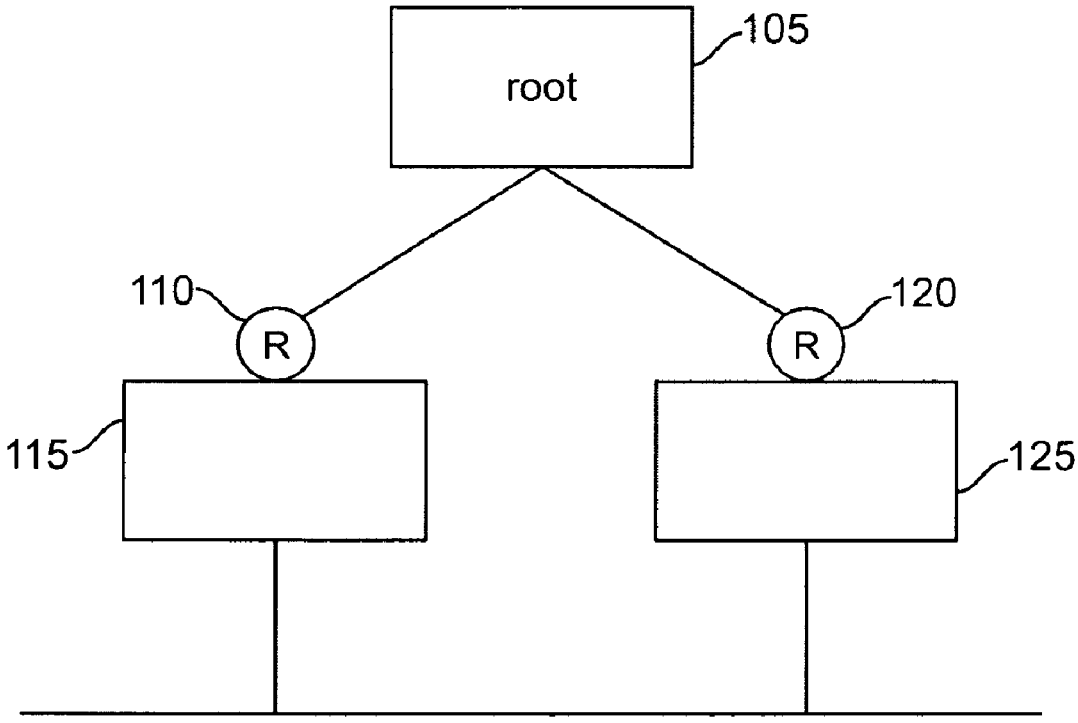
FIGS. 1 through 4 are block diagrams shown for the purpose of describing various terminologies for port roles in the 802.1w standard.

FIGS. 1 through 4 are block diagrams shown for the purpose of describing various terminologies for port roles in the 802.1w (rapid spanning-tree protocol or RSTP) standard. The port receiving the best Bridge Protocol Data Unit (BPDU) on a bridge is a "root port". This is the port that is closest to the root bridge in terms of path cost. In the example of FIG. 1, the root bridge 105 is coupled to a root port 110 of a bridge 115 and to a root port 120 of a bridge 125. The root bridge sends BPDUs that are more useful than BPDUs that any other bridge can send. The root bridge is the only bridge in the network that does not have a root port. All other bridges receive BPDUs on at least one port.

Figure 2:
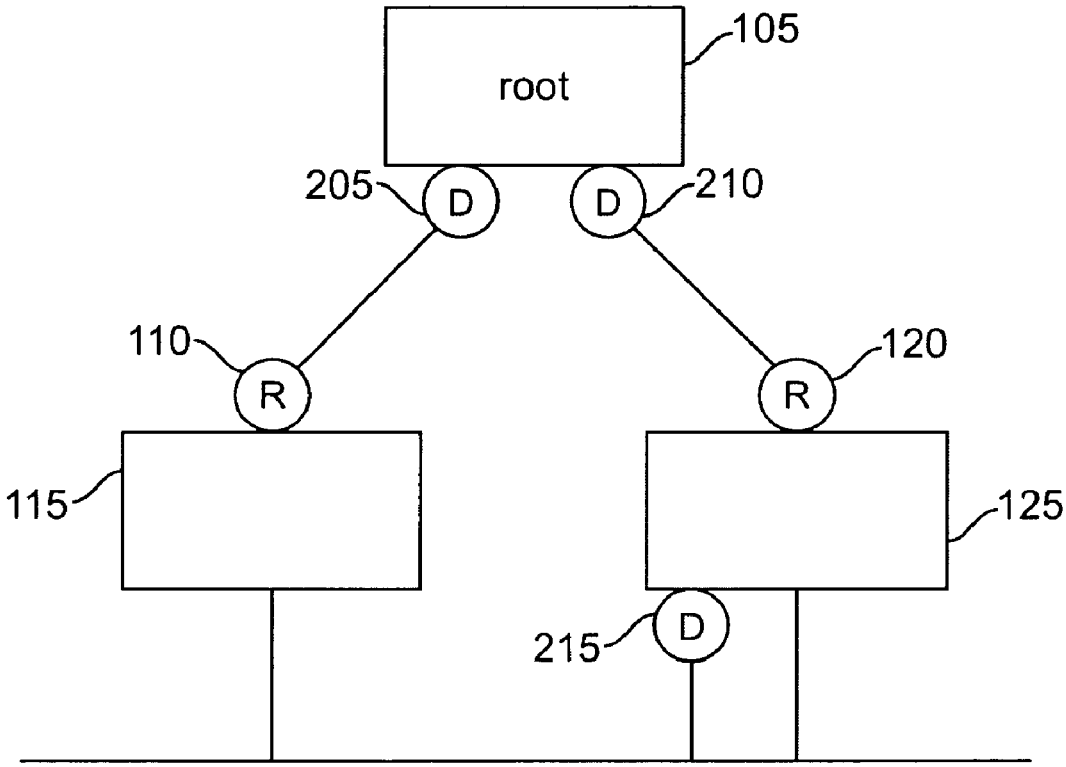

A port is a "designated port" if it can send the best BPDU on the segment to which it is connected. The 802.1w bridges (as well as 802.1D bridges) create a bridge domain by linking together different segments such as, for example, Ethernet segments. On a given segment, there can only be one path toward the root bridge. If there were two paths, then there would be a bridging loop in the network. All bridges connected to a given segment listen to each other's BPDUs and agree on the bridge sending the best BPDU as the designated bridge for the segment. The corresponding port on that bridge is designated. In the example of FIG. 2, the designated ports are shown as ports 205 and 210 on the root bridge 105 and port 215 on the bridge 125.

Figure 3:
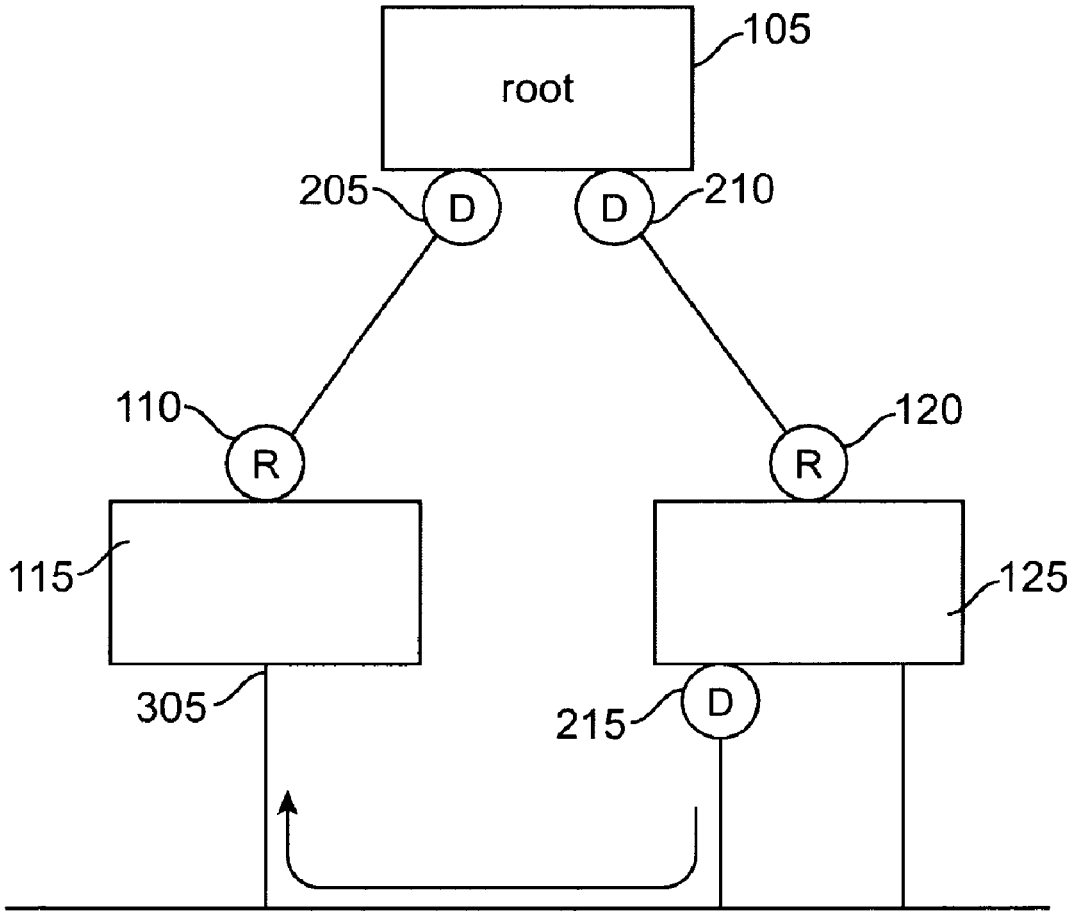

A "blocked port" is defined as not being the designated port or the root port. A blocked port receives a more useful BPDU than the BPDU it would send out on its segment. An "alternate port" is a port blocked by receiving more useful BPDUs from another bridge. In the example of FIG. 3, the alternate port is denoted as 305 on the bridge 115.

Figure 4:
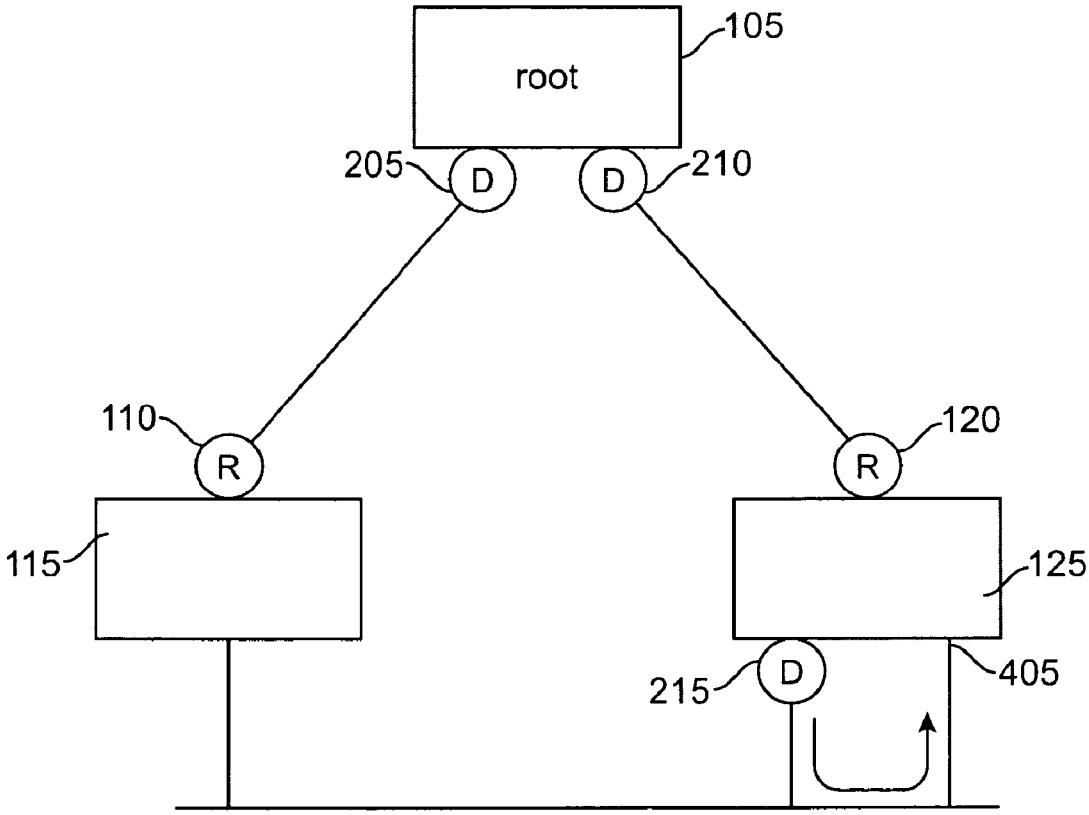

A "backup port" is a port blocked by receiving more useful BPDUs from the same bridge on which the port is located. In the example of FIG. 4, the backup port is denoted as 405 on the bridge 125.

Figure 5:
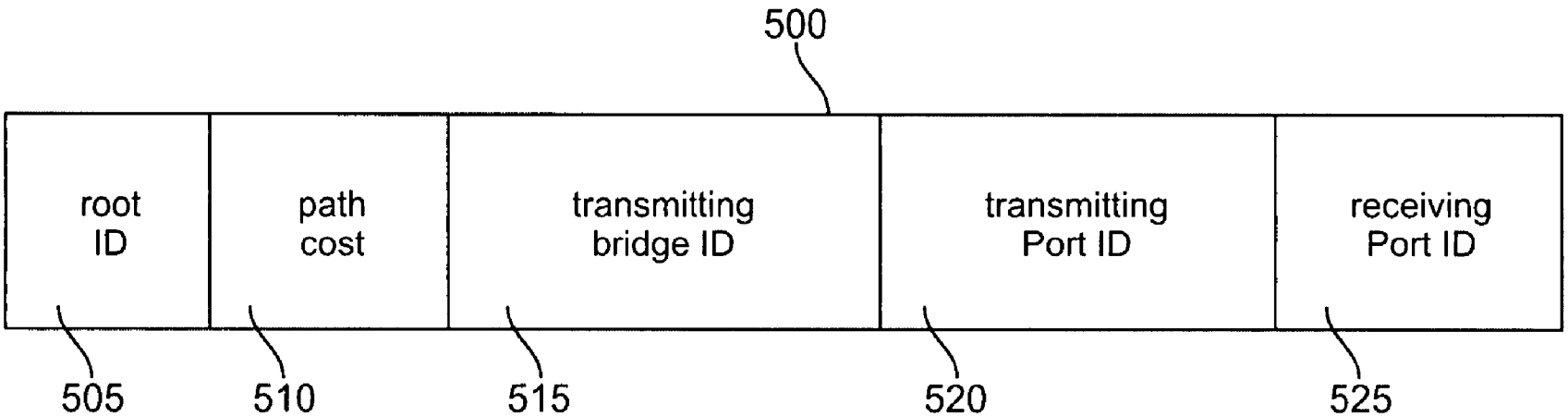
FIG. 5 is a block diagram that illustrates various field values in a Bridge Protocol Data Unit (BPDU) packet.

FIG. 5 is a block diagram that illustrates various values in a Bridge Protocol Data Unit (BPDU) 500. BPDUs are data messages that are exchanged across the switches within an extended LAN that uses a spanning tree protocol topology. BPDU packets contain information on, for example, ports, addresses, priorities and costs and ensure that the data ends up where the data was intended to go. BPDU messages are exchanged across bridges to detect loops in a network topology. The loops are then removed by shutting down selected bridge interfaces and placing redundant switch ports in a backup, or blocked, state. The BPDU 500 may also be generally referred to as messages.

In an embodiment, a BPDU 500 typically includes a root identification (ID) 505 which contains the same information as the bridge ID (identifier) in the following format (bridge priority:lowest MAC address), a path cost 510, a transmitting bridge ID 515, a transmitting port ID 520, and a receiving port ID 525. To determine the more useful or better BPDU between two particular different BPDU, the BPDU values in FIG. 5 are compared. The BPDU with the numerically lower value is selected as the more useful BPDU.

Support for Dynamic Configuration Changes

Figure 6:
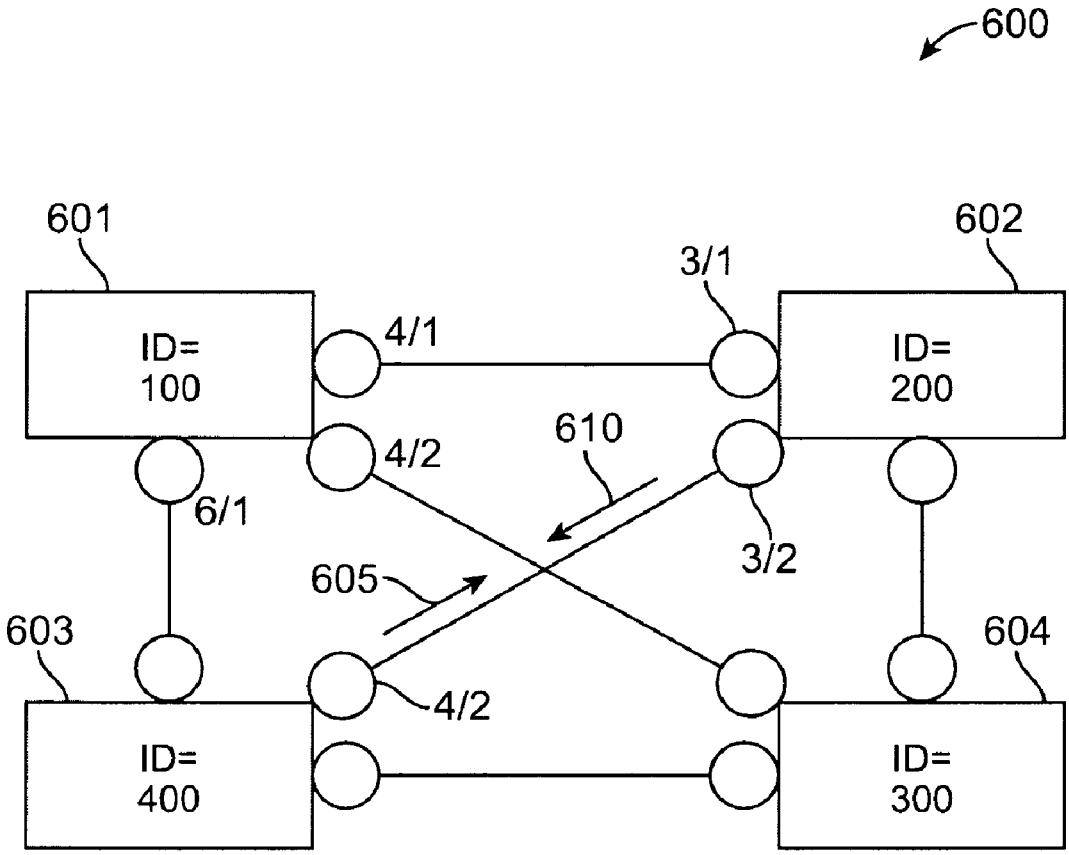
FIG. 6 is a diagram of a topology shown for purposes of describing a method of determining the more useful BPDUs between two different BPDUs.

FIG. 6 shows a diagram of a topology 600 in order to describe a method of determining the more useful BPDUs between two different BPDUs, where the topology 600 includes the bridges 601 through 604. Assume that a first BPDU (i.e., first message) 605 has the following values: [root bridge ID 505, path cost 510, transmitting bridge ID 515, transmitting port ID 520, receiving port ID 525]=[100, 64, 400, 4/2]. Assume further that a second BPDU (i.e., second message) 610 has the following values: [root bridge ID 505, path cost 510, transmitting bridge ID 515, transmitting port ID 520, receiving port ID 525]=[100, 64, 200, 3/2]. The BPDU 610 will be selected as the more useful BPDU because it has a lower bridge ID of value 200. Thus, the port 3/2 in bridge 602 will be selected as a designated port, and the port 4/2 in bridge 603 will be selected as an alternate port.

In the example of FIG. 6, assume that the current root bridge is bridge 601 with a bridge ID equal to 100. Assume that the bridge ID of current root bridge 601 is changed from Bridge ID=100 to Bridge ID=700. The bridge ID value is typically changed by a network administrator. In the RSTP algorithm, in response to the change in bridge ID, convergence will occur followed by dynamic configuration changes. Dynamic configuration changes typically include changes in the RSTP bridge priority and changes in the port priority. The convergence time may be as long as approximately 7 seconds to approximately 8 seconds. As a result, this convergence time does not meet the required time length limit of approximately 300 milliseconds that is desired for core switching.

Figure 7:
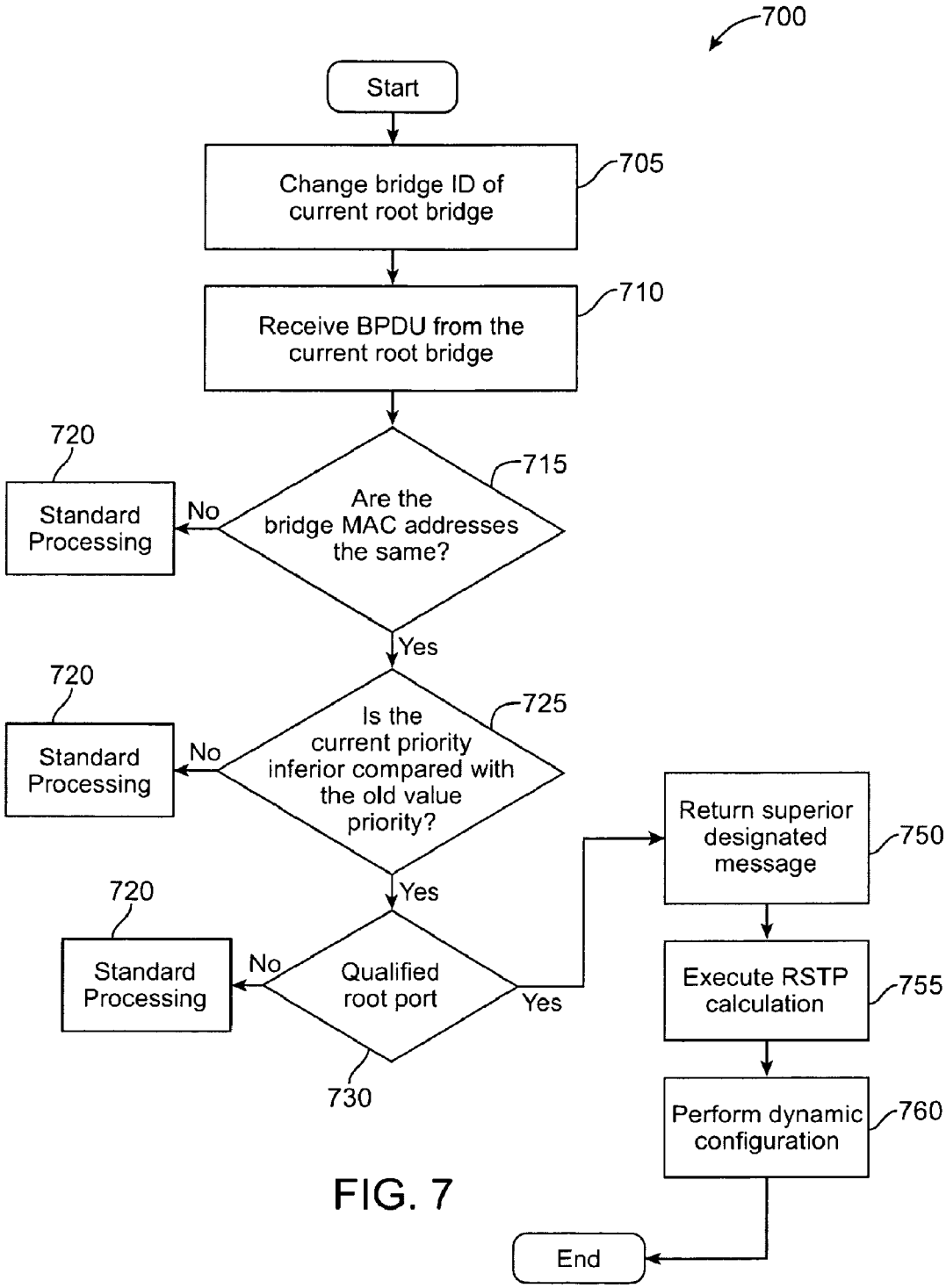
FIG. 7 illustrates a flowchart of a method to provide for rapid convergence followed by dynamic configuration changes, in accordance with an embodiment of the invention.

In one embodiment of the invention, FIG. 7 illustrates a flowchart of a method 700 to provide for rapid convergence followed by dynamic configuration changes, in accordance with an embodiment of the invention. In one embodiment, the actions being performed in FIG. 7 are typically performed by a PIM (port information state machine) 1005 (see FIG. 13). The PIM 1005 can be configured to perform these functions by use of standard programming techniques. A bridge ID of the current root bridge is changed (705) by, for example, a network administrator. The bridge ID includes a bridge priority value and a bridge MAC address, while a port ID includes a port priority value and a port number.

A receiving port connected to a port of the current root bridge then receives (710) a BPDU message from the current root bridge. A check (715) is performed to determine if the bridge MAC address currently held in the Port Priority Vector of the receiving port (e.g., in bridge 602 of FIG. 7) is the same as the bridge MAC address of the received BPDU to determine which numerical value is better. For details on the Port Priority Vector, see Section 17.18.17 in the above-noted reference on the 802.1w standard.

As noted, the root ID comprises the union of the priority value and the bridge MAC address. If the bridge MAC addresses are *not* the same, then standard processing (720) is performed under the 802.1w standard to achieve the dynamic configuration change in the system 600. For example, the MAC addresses may remain as 4/1 in this case.

If the bridge MAC addresses are [not] the same, then a check (725) is performed to determine if the current priority value is inferior to the old (or previous) priority value for a bridge. For example, assume that the bridge 601 has an old priority value of 100. If the network administrator changes the priority value to 40, then the current priority value of 40 will not be inferior to the old priority value. If the current priority value is not inferior to the old priority value, then standard processing (720) is performed under the 802.1w standard to achieve the dynamic configuration change in the system 600.

As another example, if the network administrator changes the priority value to 4000, then the current priority value of 4000 will be inferior to the old priority value of 100. If the current priority value is inferior to the old priority value, then a check (730) is made to determine if the receiving port on the bridge is a qualified root port. A qualified root port is defined as: (1) while the "rrwhile" timer has not timed out, the role of the port is equal to the selected role which is equal to the root port; and (2) the "rcvdInfowhile" timer has not timed out. An rrwhile timer running on a port means that the role of the port is ROOT PORT. Only the ROOT PORT will have the rrwhile timer at any given point on a non-root bridge. The rcvdInfowhile timer is used to determine if the message which is held by a root port, alternate port or backup port should be aged out.

The check (730) for a qualified root port is performed because when bridge 601 transmits a new message corresponding to the new priority value, it may be possible that a root port (e.g., port 3/1 in bridge 602) has already been established. If the receiving port is not a qualified root port, then standard processing (720) is performed under the 802.1w standard to achieve the dynamic configuration change in the system 600.

Figure 8:
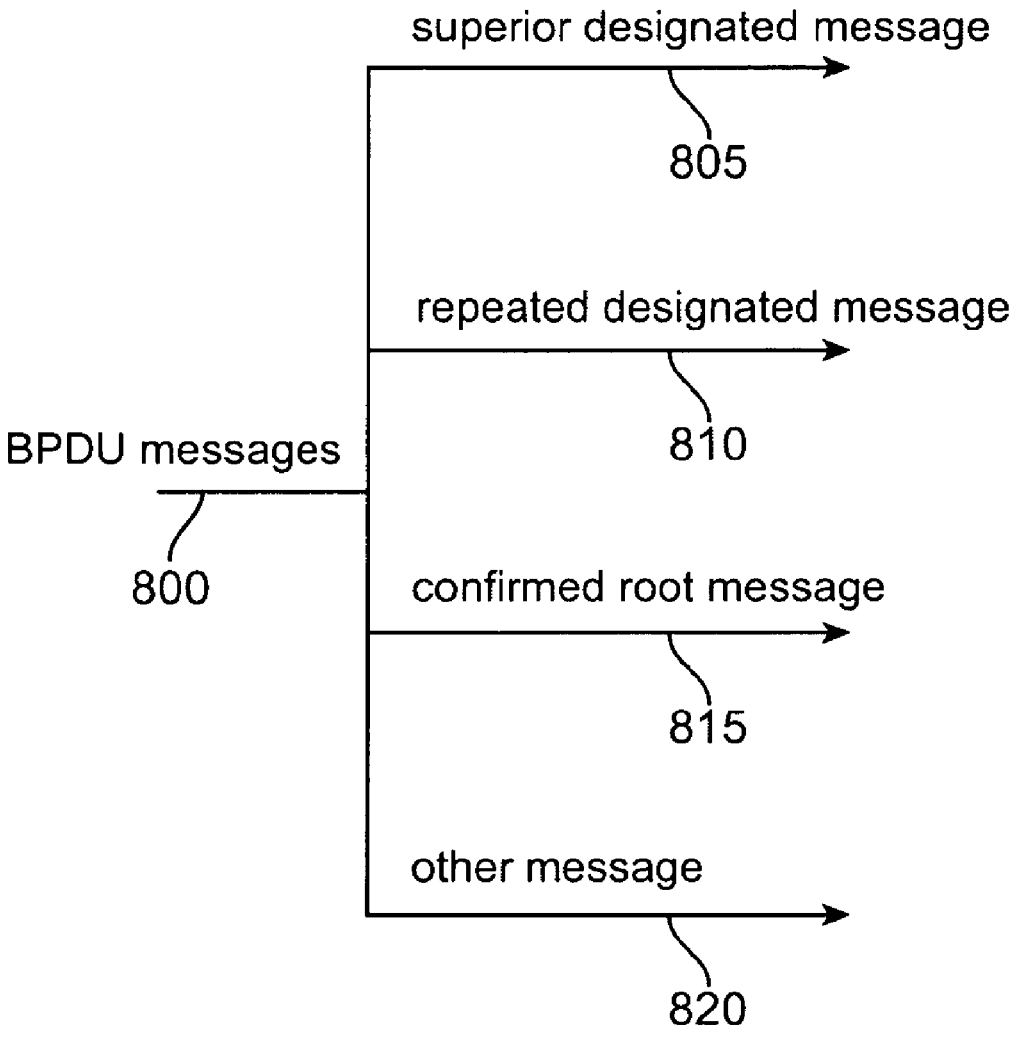
FIG. 8 is a diagram illustrating various BPDU messages.

If the port is a qualified root port, then the receiving port returns (750) the following BPDU message 800, as also shown in FIG. 8: "superior designated message" 805. In response to the superior designated message 805, each bridge will execute (755) the RSTP calculation, and based upon the RSTP calculation result, each bridge will perform (760) a dynamic configuration change.

FIG. 8 is a diagram illustrating various types of BPDU messages 800, including a superior designated message 805, a repeated designated message 810, a confirmed root message 815, and other message 820. If a bridge port receives a superior message that it has not received before, the message is categorized as a superior designated message 805 when the bridge port receives the same message after a hello interval. The second and consecutive superior messages are categorized as a repeated designated message 810.

The repeated designated message 810 is defined as a superior message that has been received by the bridge port before, and this message 810 is more superior than the message which can be transmitted by this particular bridge port.

The confirmed root message 815 is sent by a root port in order to signal the root port's connected designated port, so that the designated port can rapidly transition itself into a forwarding state. A confirmed root message 815 will have a role of root port and an agreement flag that is set in the confirmed root message 815.

An "other message" 820 is either an inferior message or a topology change indicating messages like TCN (topology change notice), or TC acknowledgement, or RST BPDU with TC flag set, or other suitable messages.

Optimizations in the Topology Change State Machine

When an RSTP bridge detects a topology change, the following events typically occur. First, the bridge starts a tcWhile timer with a value equal to twice the hello time for all its non-edge designated ports and its root port if necessary. Second, the bridge flushes the MAC addresses associated with all these ports. Third, as long as the tcWhile timer is running on a port, the BPDUs sent out of that port have the TC bit (TC flag) set. BPDUs are also sent on the root port while the tcWhile timer is active.

When a bridge receives a BPDU with the TC bit (TC flag) set from a neighbor, the following events typically occur as described below. The BPDU with the TC flag is hereinafter denoted as "RSTP TCN". The RSTP TCN performs the function of topology change detection and topology change propagation across the entire network. First, the bridge clears the MAC addresses that have been learned on all its ports except the one that received the topology change. Second, the bridge starts the tcWhile timer and sends BPDUs with the TC flag set on all its designated ports and root port. The RSTP protocol no longer uses the specific TCN BPDU (Topology Change Notification BPDU), unless a legacy bridge needs to be notified. Thus, notification of the topology change is transmitted very quickly across the entire network.

Figure 9:
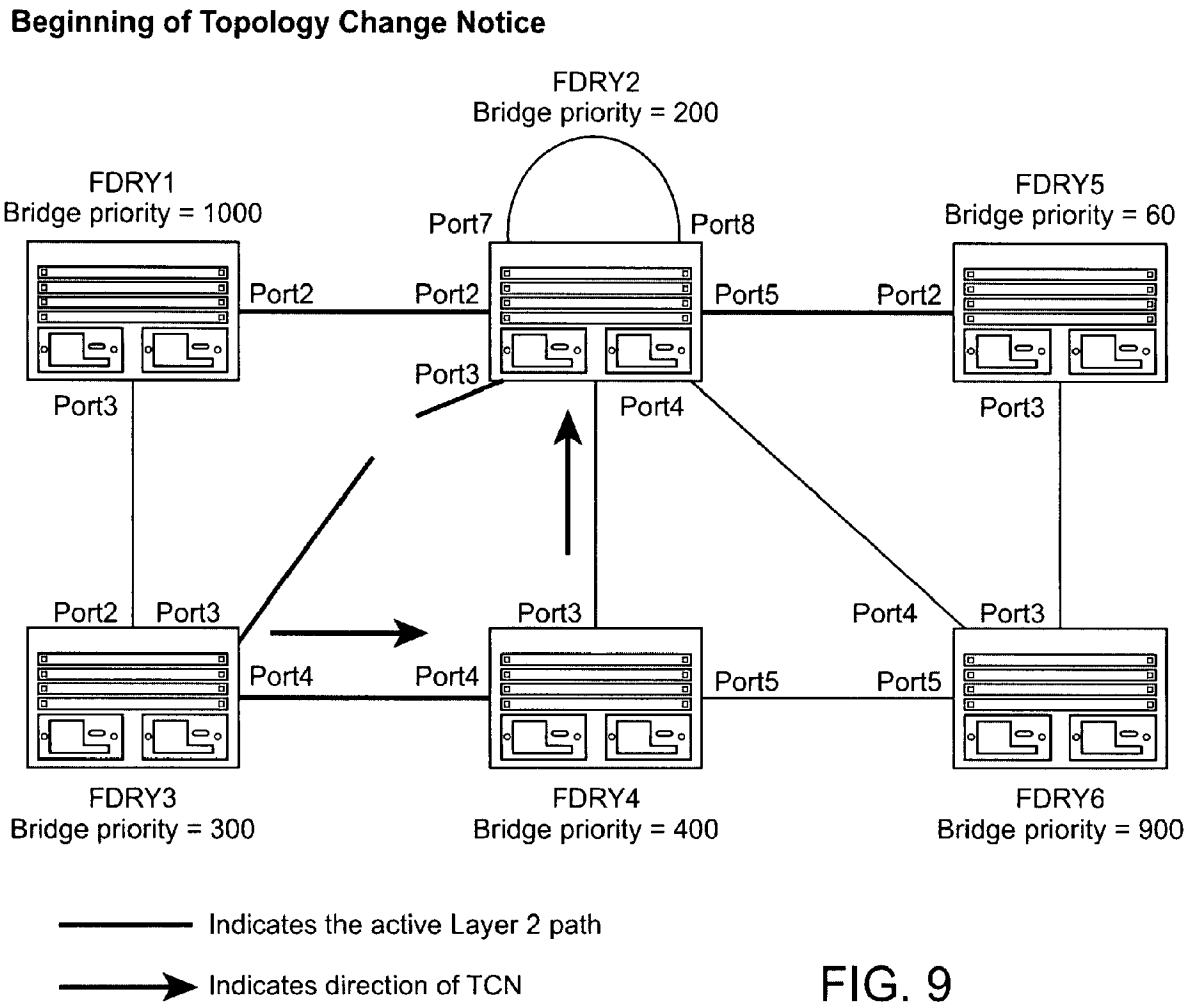
FIG. 9 is a diagram that illustrates the beginning of a Topology Change Notice (TCN).

The Topology Change state machine generates and propagates the topology change notification messages on each port. When a root port or a designated port goes into a forwarding state, the Topology Change state machine 1030 (FIG. 13) on those ports sends a topology change notice (TCN) to all bridges in the topology to propagate the topology change. It is noted that edge ports, alternate ports, or backup ports do not need to propagate a topology change. The TCN is sent in the RST BPDU that a port sends. Ports on other bridges in the topology once they receive the RST BPDU, and transmit the RSTP TCN to other bridges until all the bridges are informed of the topology change. For example, assume that port "Port3" in bridge "FDRY2" in FIG. 9 fails. The port "Port4" in bridge "FDRY3" becomes the new root port. The port "Port4" in bridge "FDRY3" sends an RST BPDU with a TCN to port "Port4" in bridge in bridge "FDRY4". To propagate the above topology change, the port "Port4" in bridge "FDRY4" then starts a TCN timer on the bridge port itself, on the bridge's root port, and on other ports on that bridge with a designate role. The, the port "Port3" in bridge "FDRY4" sends an RST BPDU with the TCN to the port "Port4" in bridge "FDRY2". Note the new active Layer 2 path in FIG. 9.

Figure 10:
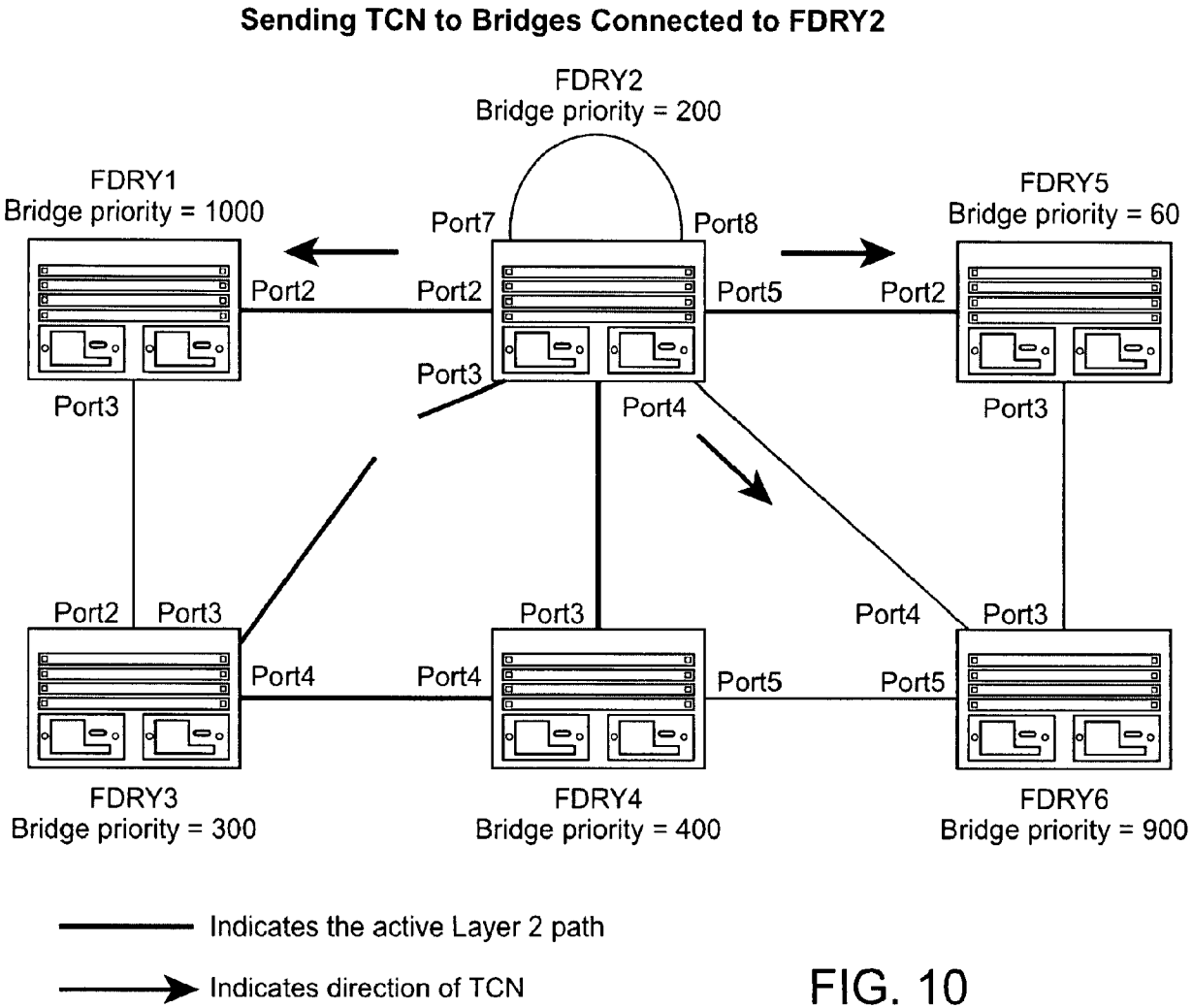
FIG. 10 is a diagram that illustrates the sending of a TCN to bridges that are connected to bridge FDRY2.
Figure 11:
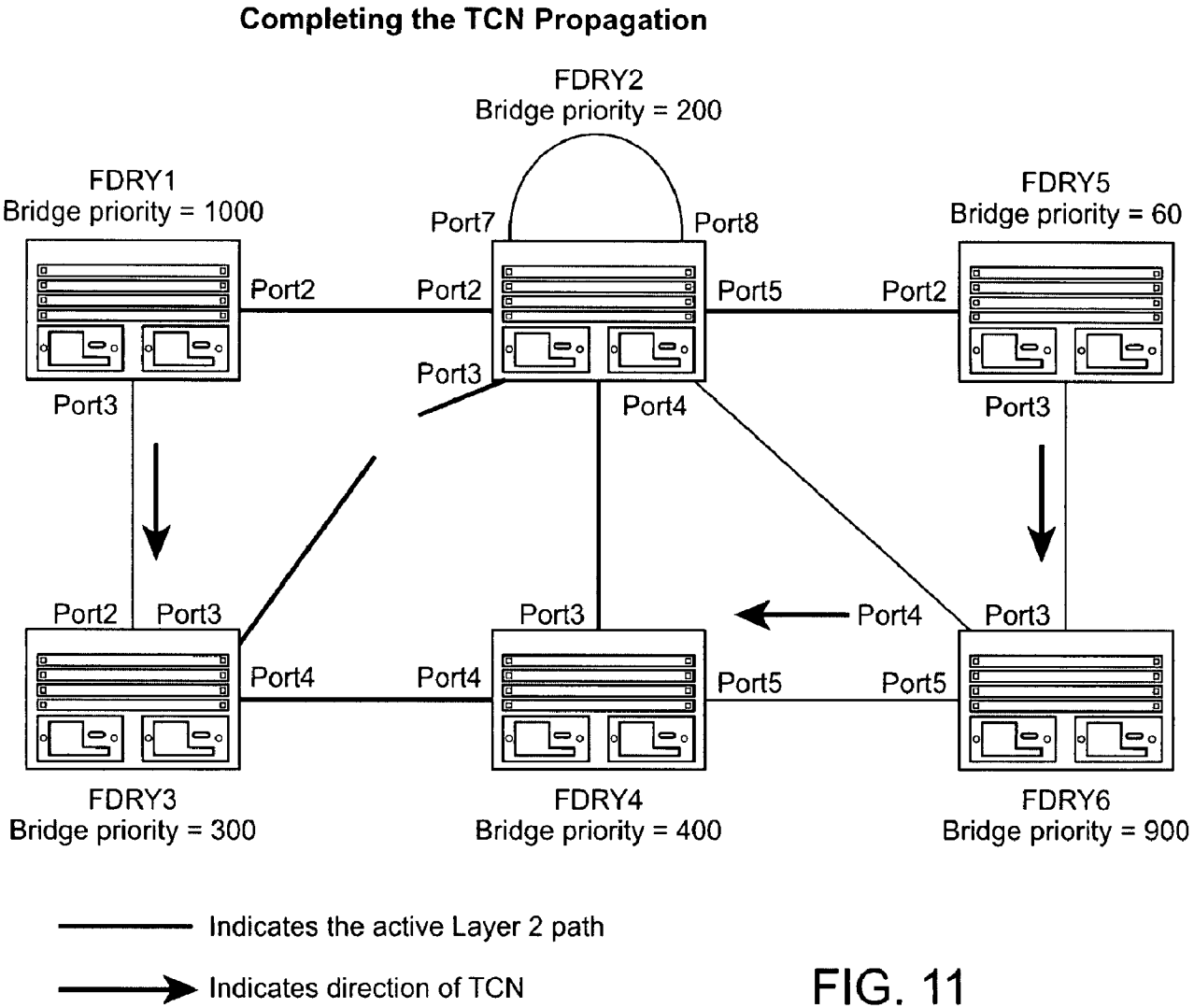
FIG. 11 is a diagram that illustrates the completion of a TCN propagation.

The bridge "FDRY2" then starts the TCN timer on the designated ports and sends RST BPDUs that contain the TCN as shown in FIG. 10. The port "Port5" in bridge "FDRY2" sends the TCN to port "Port2" in bridge "FDRY5". The port "Port4" in bridge "FDRY2" sends the TCN to port "Port4" in bridge "FDRY6". The port "Port2" in bridge "FDRY2" sends the TCN to port "Port2" in bridge "FDRY1". Then, bridge "FDRY1", bridge "FDRY5", and bridge "FDRY6" send RST BPDUs that contain the TCN to bridge "FDRY3" and bridge "FDRY4" to complete the TCN propagation.

Figure 12:
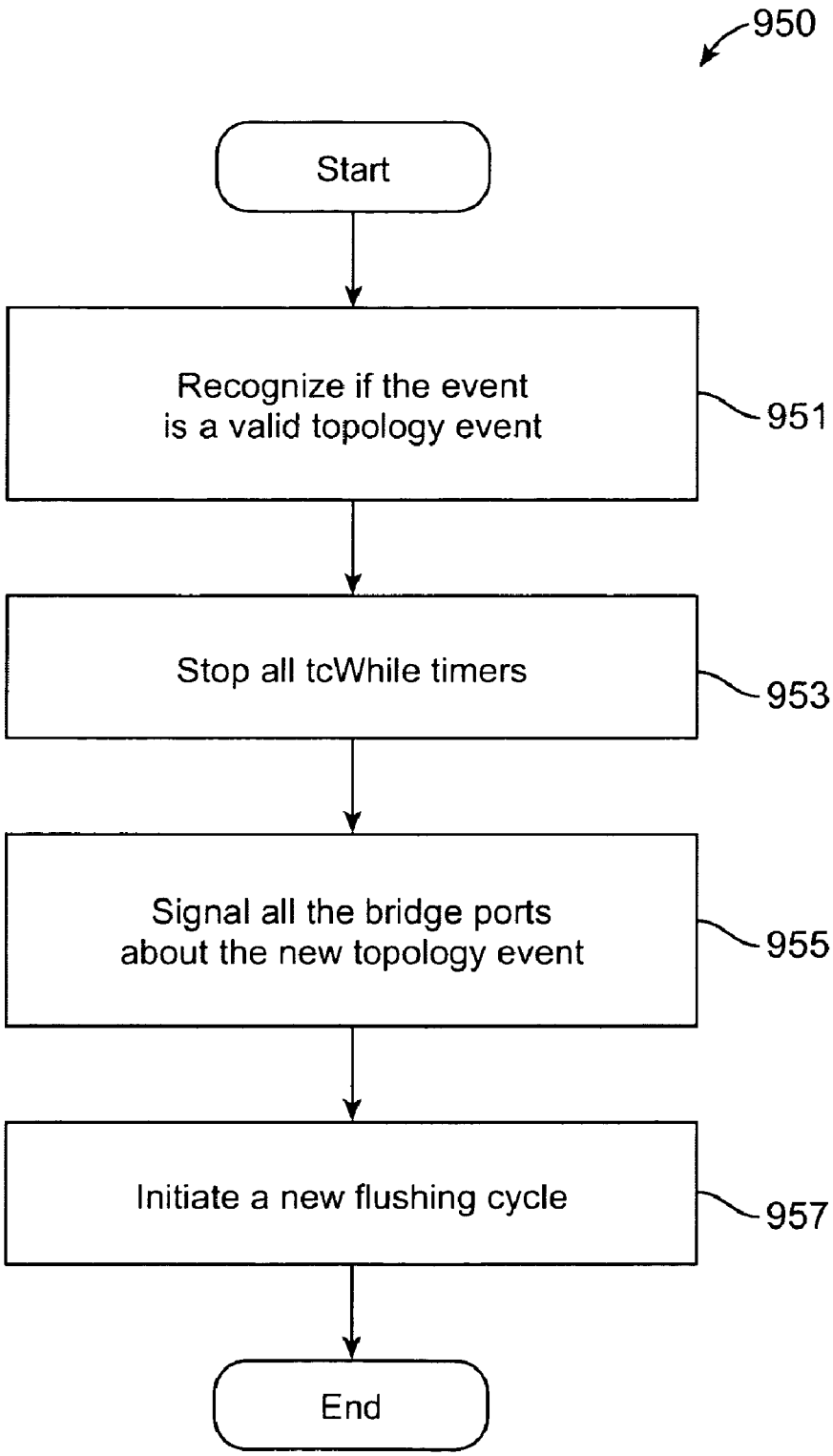
FIG. 12 is a flowchart illustrating a method of enhancing the Topology Change State Machine in the RSTP protocol, in accordance with an embodiment of the invention.

FIG. 12 is a flowchart illustrating a method 950 of enhancing the Topology Change State Machine (TCM) 1030 (FIG. 13) in the RSTP protocol, in accordance with an embodiment of the invention. The TCM first determines or recognizes (951) if an event is a valid topology change event. A valid topology change event is defined as: (1) a forwarding state on a non-edge port designated, and a forwarding state on a root port. In other words, a valid topology change is detected when a non-edge port is put into a forwarding state by a Port State Transition Machine (PST). Corresponding to this event, the Topology Change State Machine (TCM) enters into a "DETECTED" state and starts the tcWhile timer on itself. It is noted that the tcWhile timer operates on a port-level and not on a bridge-level. A root port sends out an RSTP TCN at an interval (e.g., every approximately 2 seconds) and up to the expiration of a tcWhile timer (e.g., approximately 4 seconds). Other ports in other bridges receive the RSTP TCN from the root port, and each of the other bridges then start their tcWhile timers (e.g., tcWhile timers. Since the tcWhile timers of the other bridges have started, the bridges will also send out RSTP TCNs at an interval (e.g., every 2 seconds) until their tcWhile timers expire.

In order to distinguish between a topology change detection and a topology change propagation by use of the RSTP TCN, a method in accordance with an embodiment of the invention provides the following. When the PST places a non-edge port into a forwarding state, an RSTP TCN is sent to all designated ports in the bridge and all tcWhile timers are globally stopped (953) on the bridge. As a result, the inactive tcWhile timers do not permit the transmissions of additional RSTP TCNs. By stopping all tcWhile timers, this new topology change event is propagated or signaled (955) as the latest topology change event to all bridges across the network. If a new topology change event has occurred, then a new flushing cycle of learned MAC addresses is initiated (957) on all bridges across the network. If there is no new topology change event, then a flushing cycle of the learned MAC addresses is not performed.

Thus, if the tcWhile timer is active, flushing of the learned MAC addresses is not performed if a port receives a second and subsequent RSTP TCNs. The method 950 therefore eliminates the duplicate flushing cycles of MAC addresses when a second and subsequent RSTP TCNs are received in response to a topology change events.

Steady State Optimizations in the PIM State Machine

Figure 13:
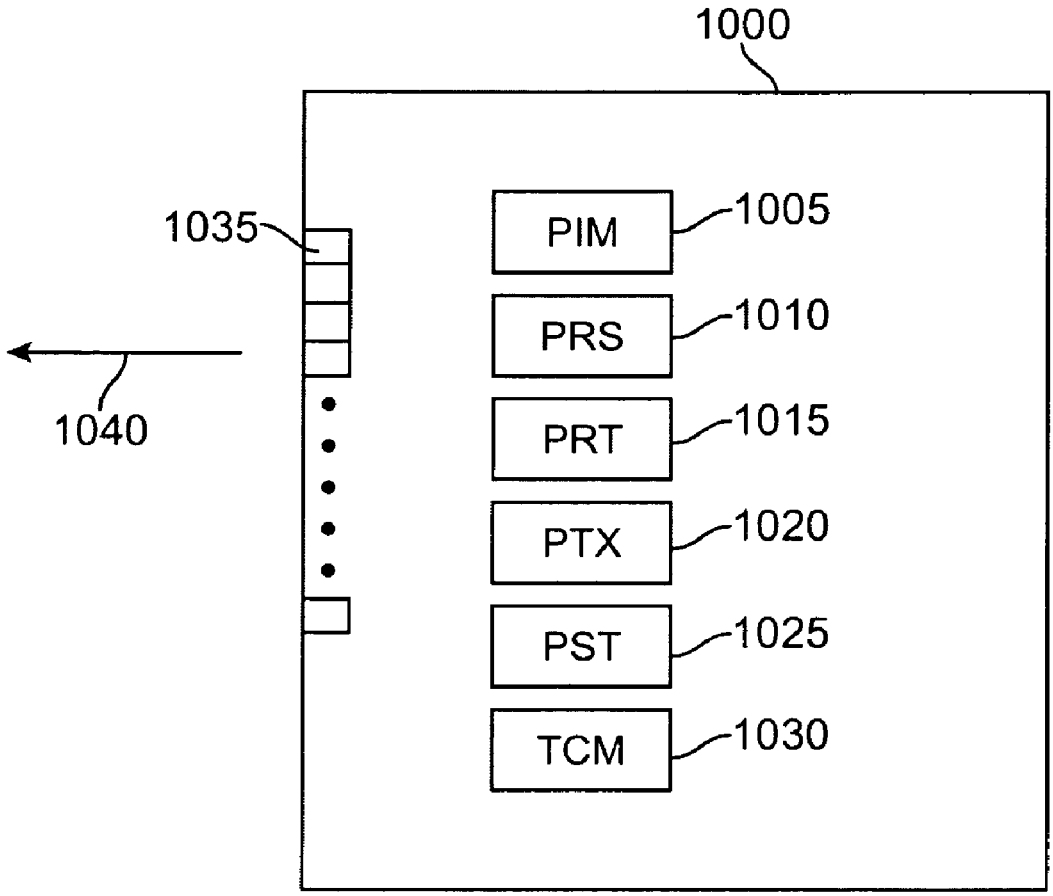
FIG. 13 is a block diagram illustrating various state machines configured for steady state optimization, in accordance with an embodiment of the invention.

FIG. 13 is a block diagram that illustrating various state machines configured for steady state optimization, in accordance with an embodiment of the invention. In the steady state, the designated ports on a bridge will send repeated designated messages. In the steady state, one goal is to minimize the invocation of the state machines 1005 to 1030 due to the intensive CPU tasks that are required for the state machines. As shown in FIG. 13, a bridge 1000 typically includes the following state machines: Port Information State Machine (PIM) 1005, Port Role Selection State Machine (PRS) 1010, Port Role Transition State Machine (PRT) 1015, Port Transmit State Machine (PTX) 1020, Port State Transition State Machine (PST) 1025, and Topology Change State Machine (TCM) 1030. For a port 1035 that is enabled, 128 spanning tree instances on the 6 state machines will typically run on the port 1035.

In an embodiment of the invention, when the repeated designated messages are sent (during steady state), invocation of the PRT state machine 1015 is avoided. By not invoking the PRT state machine 1015 during steady state, the invocation of the PTX state machine 1020, PST state machine 1025, and TCM state machine 1030 are also avoided. This advantageously avoids unnecessary CPU intensive tasks during steady state.

In a steady state of a given topology, a root port has the rrWhile timer running, while an alternate port and a backup port has the fdWhile timer running. In the steady state, applicant has observed that the expiry of these timers have no relevant computational function other than to signal the restart these particular timers. In an embodiment of the invention, if a repeated designated message is received by a root port, then the rrWhile timer is re-started. If a repeated designated message is received by an alternate port, then the fdWhile timer is re-started. If a repeated designated message is received on an alternate port, where the proposal flag is set on the repeated designated message and the port stated indicated in the BPDU is forwarding, then the proposal flag will be ignored.

Figure 14:
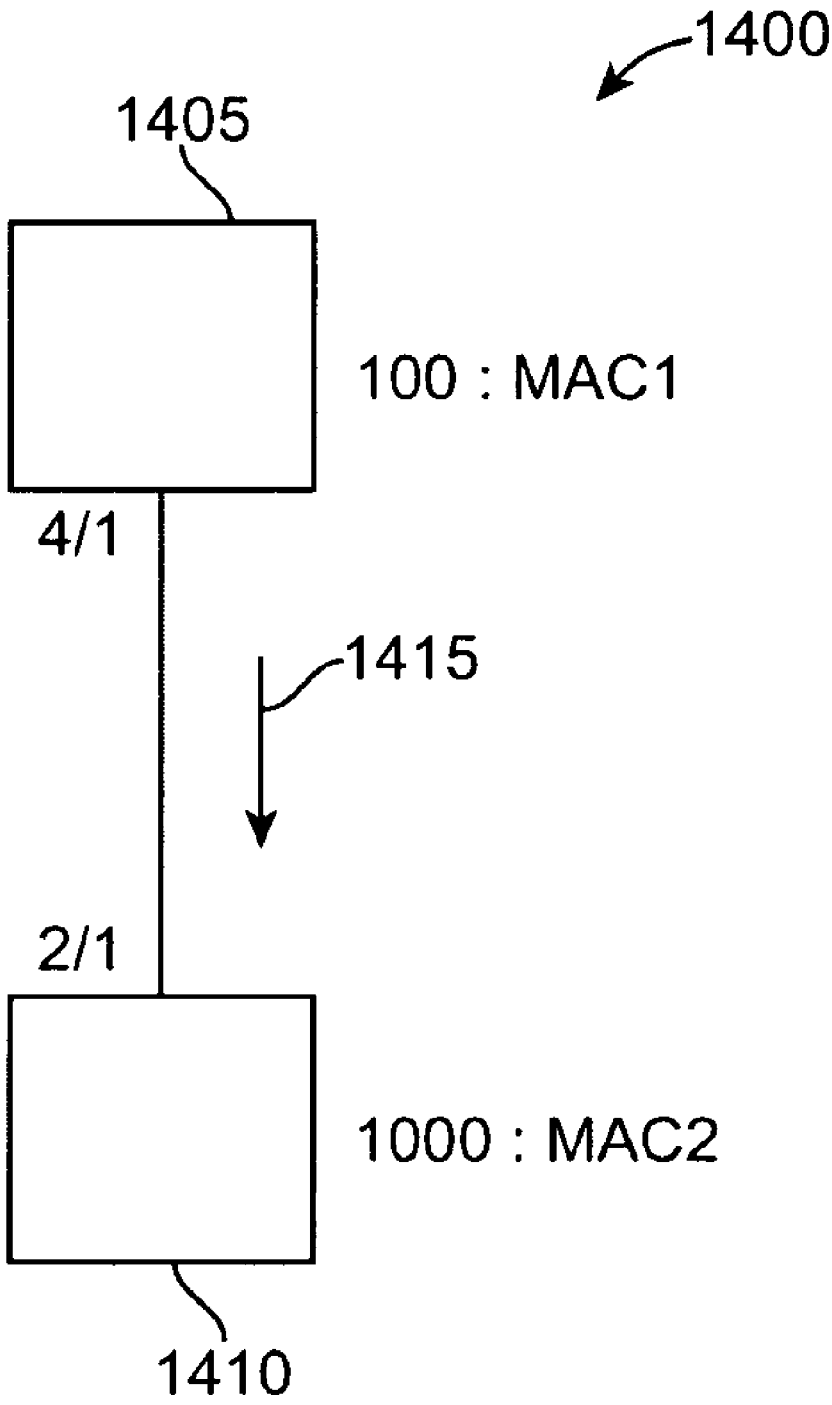
FIG. 14 is a block diagram that illustrates a method of steady state optimization, in accordance with an embodiment of the invention

For example, as shown in the system 1400 FIG. 14, assume that bridge 1405 has a root ID of (100:MAC1) and bridge 1410 has a root ID of (1000:MAC2). The first time that the message 1415 is received, the message will be a superior designated message. The second time that the superior designated message is received, it will be a repeated designated message. The repeating message will indicate a steady state condition. Thus, in the steady state, if a root port (2/1) in bridge 1410 receives a superior designated message and a repeated designated message, then the rrWhile timer and fdWhile timer are re-started (and therefore not permitted to expire) by the PIM 1005 (FIG. 13). As a result, in the steady state, an embodiment of the invention advantageously avoids the timer expiration process of previous approaches and avoids the additional processing tasks required in the timer expiration process.

Figure 15:
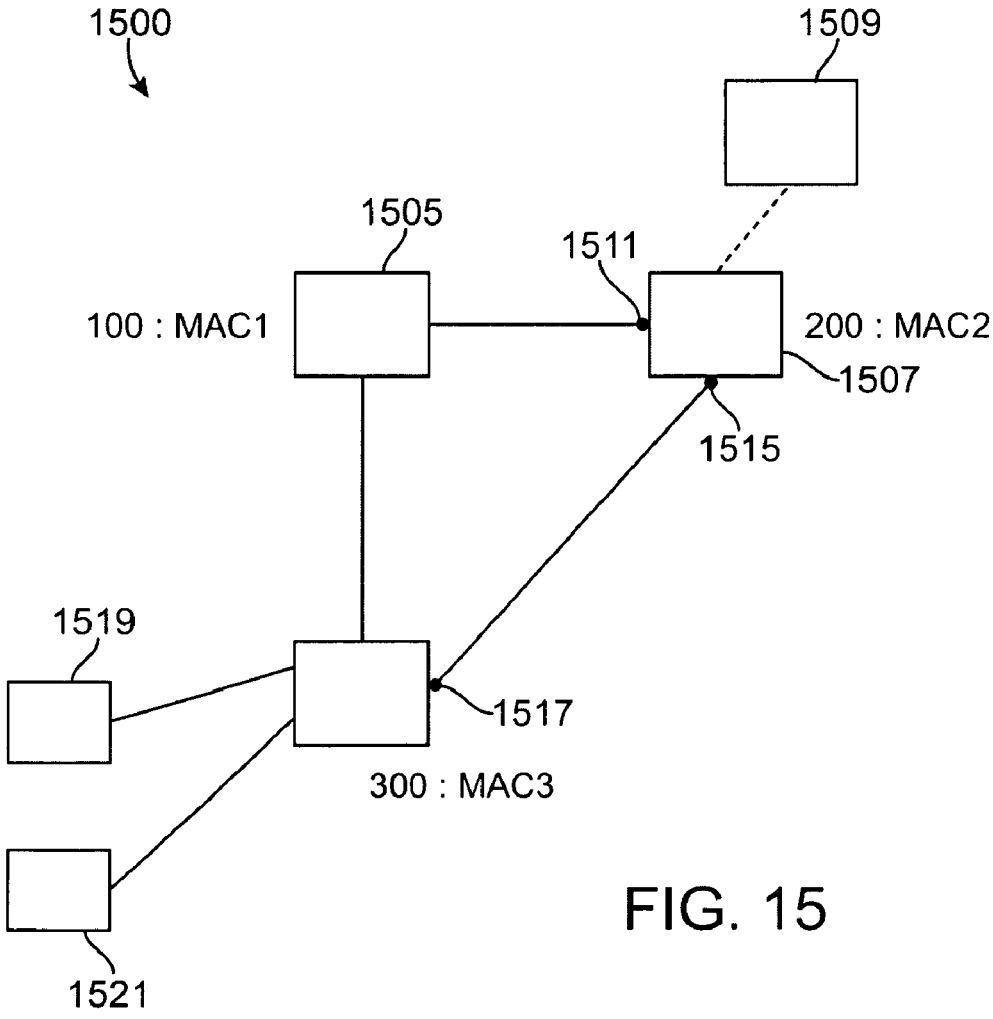
FIG. 15 is a block diagram that illustrates another method of steady state optimization, in accordance with an embodiment of the invention.

FIG. 15 is a block diagram that illustrates another method of steady state optimization, in accordance with an embodiment of the invention. In the example of system 1500, assume the following parameters. The bridge 1505 has a root ID of (100:MAC1), the bridge 1507 has a root ID of (200: MAC2), and the bridge 1517 had a root ID of (300:MAC3). An active traffic port is formed between the designated port and root port. Thus, if a ping message is to be sent to a device 1509 (e.g., a laptop computer), then the ping message will follow the active traffic port. The PRS state machine 1010 (FIG. 13) is not invoked during the following conditions. The designated port is 1515, while the alternate port is in bridge 1517. The designated port 1515 goes into a forwarding state only after two (2) instances of expiration of the fdWhile timer and will be sending proposals to the alternate port in the bridge 1517, while this alternate port will not transmit messages to the designated port at all. In an embodiment of the invention, when a BPDU proposal flag is received, the PRS and PRT are not invoked since the designated port has been attached to the alternate port. Thus, the additional processing tasks during these state machine invocations are advantageously avoided. It is noted, however, that if the BPDU proposal was received from device 1519 (e.g., a personal computer) or switch 1521 then the PRS is invoked in order to be compliant with the 802.1w standard. In this case, the BPDU proposal may have a new value and the port designations may change. As a result, the PRS will be required to be invoked.

The various engines discussed herein may be, for example, software, commands, data files, programs, code, modules, instructions, or the like, and may also include suitable mechanisms.

Reference throughout this specification to "one embodiment", "an embodiment", or "a specific embodiment" means that a particular feature, structure, or characteristic described in connection with the embodiment is included in at least one embodiment of the present invention. Thus, the appearances of the phrases "in one embodiment", "in an embodiment", or "in a specific embodiment" in various places throughout this specification are not necessarily all referring to the same embodiment. Furthermore, the particular features, structures, or characteristics may be combined in any suitable manner in one or more embodiments.

Other variations and modifications of the above-described embodiments and methods are possible in light of the foregoing teaching.

Further, at least some of the components of an embodiment of the invention may be implemented by using a programmed general purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

It is also within the scope of the present invention to implement a program or code that can be stored in a machine-readable medium to permit a computer to perform any of the methods described above.

Additionally, the signal arrows in the drawings/Figures are considered as exemplary and are not limiting, unless otherwise specifically noted. Furthermore, the term "or" as used in this disclosure is generally intended to mean "and/or" unless otherwise indicated. Combinations of components or actions will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

It is also noted that the various functions, variables, or other parameters shown in the drawings and discussed in the text have been given particular names for purposes of identification. However, the function names, variable names, or other parameter names are only provided as some possible examples to identify the functions, variables, or other parameters. Other function names, variable names, or parameter names may be used to identify the functions, variables, or parameters shown in the drawings and discussed in the text.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method comprising:

at a network device configured to perform a bridging function, examining a message comprising a first bridge media access control (MAC) address of a current root bridge;

if the first bridge MAC addresses and a second bridge MAC address currently held by a receiving port of the network device are [not] the same, then comparing a current priority value to a previous priority value of the current root bridge;

if the current priority value is inferior to the previous priority value, then determining if the port receiving the message is a qualified root port; and if the port is a qualified root port, then returning a superior designated message to permit each bridge to execute a rapid spanning tree calculation for use in a dynamic configuration change.

2. The method of claim 1 wherein the message is a bridge protocol data unit (BPDU) packet.

3. A network device comprising:

a memory; and a state machine configured to:

examine a message comprising a first bridge media access control (MAC) address of a current root bridge;

if the first bridge MAC address and a second bridge MAC address currently held by a receiving port of the network device are [not] the same, then compare a current priority value to a previous priority value of the current root bridge;

if the current priority value is inferior to the previous priority value, then determine if the port receiving the message is a qualified root port; and if the port is a qualified root port, then return a superior designated message to permit each bridge to execute a rapid spanning tree calculation for use in a dynamic configuration change.

4. The network device of claim 3 wherein the message is a bridge protocol data unit (BPDU) packet.

5. An article of manufacture, comprising:

a machine-readable medium having stored thereon instructions to:

examine a message comprising a first bridge media access control (MAC) address of a current root bridge;

if the first bridge MAC address and a second bridge MAC address currently held by a receiving port of the network device are [not] the same, then compare a current priority value to a previous priority value of the current root bridge;

if the current priority value is inferior to the previous priority value, then determine if the port receiving the message is a qualified root port; and if the port is a qualified root port, then return a superior designated message to permit each bridge to execute a rapid spanning tree calculation for use in a dynamic configuration change.

6. An apparatus comprising:

means for, at a network device configured to perform a bridging function, examining a message comprising a first bridge media access control (MAC) address of a current root bridge;

means for, if the first bridge MAC address and a second bridge MAC address currently held by a receiving port of the network device are [not] the same, then comparing a current priority value to a previous priority value of the current root bridge;

means for, if the current priority value is inferior to the previous priority value, then determining if the port receiving the message is a qualified root port; and means for, if the port is a qualified root port, then returning a superior designated message to permit each bridge to execute a rapid spanning tree calculation for use in a dynamic configuration change.

7. A method comprising:

at a network device configured to perform a bridging function, examining a message comprising a first bridge address of a current root bridge;

if the first bridge address and a second bridge address currently held by a receiving port of the network device are [not] the same, then comparing a current priority value to a previous priority value of the current root bridge;

if the current priority value is inferior to the previous priority value, then determining if the port receiving the message is a qualified root port; and if the port is a qualified root port, then returning a superior designated message to permit each bridge to execute a rapid spanning tree calculation for use in a dynamic configuration change.

8. The method of claim 7 wherein the message is a bridge protocol data unit (BPDU) packet.

9. A network device comprising:

a memory; and a state machine configured to:

examine a message comprising a first bridge address of a current root bridge;

if the first bridge address and a second bridge address currently held by a receiving port of the network device are [not] the same, then compare a current priority value to a previous priority value of the current root bridge;

if the current priority value is inferior to the previous priority value, then determine if the port receiving the message is a qualified root port; and if the port is a qualified root port, then return a superior designated message to permit each bridge to execute a rapid spanning tree calculation for use in a dynamic configuration change.

10. The network device of claim 9 wherein the message is a bridge protocol data unit (BPDU) packet.

11. An article of manufacture, comprising:

a machine-readable medium having stored thereon instructions to:

examine a message comprising a first bridge address of a current root bridge;

if the first bridge address and a second bridge address currently held by a receiving port of the network device are [not] the same, then compare a current priority value to a previous priority value of the current root bridge;

if the current priority value is inferior to the previous priority value, then determine if the port receiving the message is a qualified root port; and if the port is a qualified root port, then return a superior designated message to permit each bridge to execute a rapid spanning tree calculation for use in a dynamic configuration change.

12. An apparatus comprising:

means for, at a network device configured to perform a bridging function, examining a message comprising a first bridge address of a current root bridge;

means for, if the first bridge address and a second bridge address currently held by a receiving port of the network device are [not] the same, then comparing a current priority value to a previous priority value of the current root bridge;

means for, if the current priority value is inferior to the previous priority value, then determining if the port receiving the message is a qualified root port; and means for, if the port is a qualified root port, then returning a superior designated message to permit each bridge to execute a rapid spanning tree calculation for use in a dynamic configuration change.

* * * * *